United States Patent [19]

Takanohashi

[11] Patent Number: 5,648,103
[45] Date of Patent: Jul. 15, 1997

[54] EJECTOR APPARATUS

[75] Inventor: Ryuichi Takanohashi, Chiba, Japan

[73] Assignee: Sumitomo Heavy Industries, Ltd., Japan

[21] Appl. No.: 595,577

[22] Filed: Feb. 1, 1996

[30] Foreign Application Priority Data

Feb. 3, 1995 [JP] Japan .................................. 7-017022

[51] Int. Cl.$^6$ .................................................. B29C 45/40
[52] U.S. Cl. .......................... 425/107; 425/169; 425/444; 425/556; 425/593
[58] Field of Search ........................ 425/556, 593, 425/444, 451.6, 107, 169

[56] References Cited

U.S. PATENT DOCUMENTS

| | | | |
|---|---|---|---|
| 4,865,536 | 9/1989 | Inaba et al. | 425/556 |
| 5,196,213 | 3/1993 | Watanabe et al. | 425/556 |
| 5,370,524 | 12/1994 | Liang et al. | 425/556 |

*Primary Examiner*—James P. Mackey
*Attorney, Agent, or Firm*—Lorusso & Loud

[57] ABSTRACT

An ejector apparatus includes a movable platen disposed facing a stationary platen and adapted for advancing and retracting movement along tie bars, a toggle mechanism disposed between the movable platen and a toggle support so as to advance and retract the movable platen, a servomotor fixed to the movable platen and including a stator and a rotor, a hollow shaft fixed to the rotor, a ball nut fixed to the hollow shaft, a ball screw shaft which is screw-engaged with the ball nut and is advanced and retracted by rotation of the ball nut, a cross head connected to the ball screw shaft so as to be advanced and retracted together with the ball screw shaft, and an ejector pin connected to the cross head. The hollow shaft is rotated by driving the servomotor, thereby advancing the cross head. With this operation, the ejector pin is advanced to push out a molded product. Since no timing belt is needed, the durability of the ejector apparatus can be improved, and the peripheral area of an injection molding machine can be prevented from being dirtied.

9 Claims, 8 Drawing Sheets

5,648,103

EJECTOR APPARATUS

BACKGROUND OF THE INVENTION

1. Field of the Invention

The present invention relates to an ejector apparatus.

2. Description of the Related Art

Conventionally, in a injection molding machine, a resin heated and melted in a heating cylinder is charged into a cavity in a die apparatus at high pressure. The molten resin is then cooled and solidified in the cavity to obtain a molded product.

The die apparatus is composed of a stationary die and a movable die. A toggle mechanism advances and retracts the movable die so as to contact the movable die with and separate the same from the stationary die, thereby effecting die closing, die clamping, and die opening. During die opening, a die clamping apparatus retracts, leaving a molded product in the movable die. Subsequently, an ejector apparatus advances ejector pins so as to push the molded product out of the movable die.

To achieve the ejecting operation described above, the ejector pins are disposed such that their front ends face the cavity and that their rear ends are fixed to an ejector plate. The rear end of the ejector plate is connected to an ejector pin feed apparatus via ejector rods. When the ejector pin feed apparatus is operated so as to advance the ejector plate via the ejector rods, the ejector pins fixed to the ejector plate advance.

In a motor driven injection molding machine, the ejector pin feed apparatus is usually driven by an electric motor.

FIG. 1 is a front view of a conventional single-axis ejector apparatus, and FIG. 2 is a side view of the conventional single-axis ejector apparatus.

In FIGS. 1 and 2, reference numeral 11 denotes a movable platen. An unillustrated movable die is attached to the front end (to the right end in FIG. 1) of the movable platen 11. The movable platen 11 is advanced and retracted by a toggle mechanism 14 along tie bars 12 extending between a stationary platen and a toggle support, both not shown.

An ejector pin feed apparatus 16 is disposed at the rear end (at the left end in FIG. 1) of the movable platen 11. The ejector pin feed apparatus 16 includes guide posts 18. The front ends of the guide posts 18 are fixed to the movable platen 11, and a support member 19 is fixed to the rear ends of the guide posts 18. A ball nut 22 is rotatably supported by the support member 19 via a bearing 20.

The inner circumference of the ball nut 22 is screw-engaged with a ball screw shaft 24. A cross head 25 is fixed to the front end of the ball screw shaft 24. Further, ejector rods 27 are fixed to the front end of the cross head 25. Accordingly, by rotating the ball nut 22, the ball screw shaft 24 can be advanced and retracted in the direction of arrow A so as to advance and retract the ejector rods 27 in the same direction.

The ejector pin feed apparatus 16 is operated by a servomotor 28, which is drivingly connected to the ball nut 22 via a belt transmission mechanism 31. The belt transmission mechanism 31 comprises a pulley 32 attached to the output shaft of the servomotor 28, a pulley 33 attached to the rear end of the ball nut 22, and a timing belt 34 wound around the pulleys 32 and 33 with tension.

Accordingly, when the servomotor 28 is driven, the rotational motion of the servomotor 28 is transmitted to the ball nut 22 via the belt transmission mechanism 31. The ball nut 22 and the ball screw shaft 24 convert the rotational motion into a linear motion, so that unillustrated ejector pins are advanced and retracted.

Next, a two-axis ejector apparatus will be described.

FIG. 3 is a front view of a conventional two-axis ejector apparatus, and FIG. 4 is a side view of the conventional two-axis ejector apparatus.

In FIGS. 3 and 4, reference numeral 11 denotes a movable platen. An unillustrated movable die is attached to the front end (to the right end in FIG. 3) of the movable platen 11. The movable platen 11 is advanced and retracted by a toggle mechanism 14 along tie bars 12 extending between a stationary platen and a toggle support, both not shown.

An ejector pin feed apparatus 16 is disposed at the rear end (at the left end in FIG. 3) of the movable platen 11. The ejector pin feed apparatus 16 includes guide posts 18. The front ends of the guide posts 18 are fixed to the movable platen 11, and a cross head 41 is fixed to the rear ends of the guide posts 18. A ball nut 42 is fixed to the cross head 41.

The inner circumferences of the ball nut 42 is screw-engaged with a ball screw shaft 43. The ball screw shaft 43 is supported at its front end by an unillustrated bearing such that the ball screw shaft 43 is rotatable with respect to the movable platen 11.

Ejector rods 27 are fixed to the front end of the cross head 41. Thus, by rotating the ball screw shaft 43, the cross head 41 can be advanced and retracted so as to advance and retract the ejector rods 27.

The ejector pin feed apparatus 16 is operated by a servomotor 28, which is drivingly connected to the ball screw shaft 43 via a belt transmission mechanism 46. The belt transmission mechanism 46 comprises a pulley 32 attached to the output shaft of the servomotor 28, a plurality of pulleys 33 attached to the front ends of the ball screw shaft 43, and a timing belt 34 wound around the pulleys 32 and 33 with tension.

Accordingly, when the servomotor 28 is driven, the rotational motion of the servomotor 28 is transmitted to the ball screw shaft 43 via the belt transmission mechanism 46. The ball screw shaft 43 and the ball nuts 42 convert the rotational motion into a linear motion, so that unillustrated ejector pins are advanced and retracted.

However, in the above-described conventional ejector apparatuses, a considerably large tension must be applied to the timing belt 34 in order to push a molded product out of the movable die for perfect separation. In addition, since the ejector pins must be repeatedly advanced and retracted, and such a repeated operation places the ejector apparatus under severe conditions, the durability of the apparatuses deteriorates.

That is, since a large tension must be applied to the timing belt 34, an eccentric load acts on the ball screw shafts 24 (FIG. 1) and 43, thereby decreasing the efficiency of the ball screw shafts 24 and 43, increasing the load of the servomotor 28, and shortening the service life of the ball screw shafts 24 and 43.

Also, the resultant elongation of the timing belt 34 deteriorates accuracy in controlling the ejector apparatus, and causes breakage and wear of the timing belt 34. Therefore, the timing belt 34 must be exchanged for a new one within a relatively short period of time.

Moreover, dust is produced due to wear of the timing belt 34 and dirties the area around the injection molding machine.

The durability of the timing belt 34 can be improved by increasing the hardness of the timing belt 34. In this case, however, noise is generated when the ejector apparatus is operated at high speed. Also, a chain, a rack and pinion, or the like can be used instead of the timing belt 34 so as to enhance durability. In these cases, however, the ejector apparatus cannot be operated at high speed because of poor control accuracy and generation of play. In addition, lubrication is required, and the peripheral area of the ejector apparatus is therefore dirtied due to lubricant.

SUMMARY OF THE INVENTION

An object of the present invention is to solve the above-mentioned problems in the conventional ejector apparatus, and to provide an ejector apparatus which has an enhanced durability, and which does not dirty the peripheral area of an injection molding machine.

To achieve the above object, an ejector apparatus according to the present invention includes a movable platen disposed facing a stationary platen and adapted for advancing and retracting movement along tie bars, a toggle mechanism disposed between the movable platen and a toggle support so as to advance and retract the movable platen, a servomotor fixed to the movable platen and including a stator and a rotor, a hollow shaft fixed to the rotor, a ball nut fixed to the hollow shaft, a ball screw shaft which is screw-engaged with the ball nut and is advanced and retracted by rotation of the ball nut, a cross head connected to the ball screw shaft so as to be advanced and retracted together with the ball screw shaft, and an ejector pin connected to the cross head.

In this case, the hollow shaft is rotated by driving the servomotor so as to advance the cross head via the ball screw shaft. With this operation, the ejector pin is advanced to push out a molded product.

Since no timing belt is needed, the durability of the ejector apparatus can be improved, and the peripheral area of an injection molding machine can be prevented from being dirtied.

In another ejector apparatus according to the present invention, a depression is formed in a rear end surface of the movable platen.

In this case, the axial dimension of the ejector apparatus can be reduced by an amount corresponding to the depth of the depression. Moreover, the ejector apparatus is prevented from interfering with the toggle mechanism.

In still another ejector apparatus according to the present invention, the cross head is connected to the rear end of the ball screw shaft and is disposed to surround the ball nut.

In this case, since the cross head is disposed to surround the ball nut, a center ejector rod can be connected directly to the ball screw shaft without the cross head interposed therebetween.

Accordingly, the axial dimension of the ejector apparatus can be reduced, and the ejector apparatus is prevented from interfering with the toggle mechanism.

In still another ejector apparatus according to the present invention, the cross head is connected to the front end of the ball screw shaft.

In still another ejector apparatus according to the present invention, the hollow shaft has a first portion for allowing advancing and retracting movement of the ball screw shaft, and a second portion having a diameter greater than that of the first portion and housing the ball nut.

In this case, the ball screw shaft is advanced and retraced within the hollow shaft. Therefore, the axial dimension of the ejector apparatus can be reduced, and interference between the ejector apparatus and the toggle mechanism can be prevented.

Accordingly, the ejector apparatus can be disposed inside the toggle mechanism so as to decrease the size of the die clamping apparatus.

In still another ejector apparatus according to the present invention, the first portion of the hollow shaft is disposed within the rotor.

In this case, the rotor and the ball nut can be overlapped with each other in the radial direction.

Accordingly, the radial dimension of the ejector pin feed apparatus can be decreased.

In still another ejector apparatus according to the present invention, the hollow shaft further has a third portion having a diameter smaller than that of the first portion.

In still another ejector apparatus according to the present invention, a rotational amount sensor is disposed at the third portion of the hollow shaft.

In this case, the rotational amount of the rotor can be directly detected. Therefore, the position of the cross head can be detected accurately.

In still another ejector apparatus according to the present invention, a hole for supplying lubricant is provided at the third portion of the hollow shaft.

In this case, lubricant can be supplied for lubrication between the ball nut and the ball screw shaft, both disposed within the hollow shaft.

BRIEF DESCRIPTION OF THE DRAWINGS

The structure and features of the ejector apparatus according to the present invention will be readily appreciated as the same becomes better understood by referring to the accompanying drawings, in which.

DESCRIPTION OF PREFERRED EMBODIMENTS

Embodiments of the present invention will next be described in detail with reference to the drawings.

Figure 1:
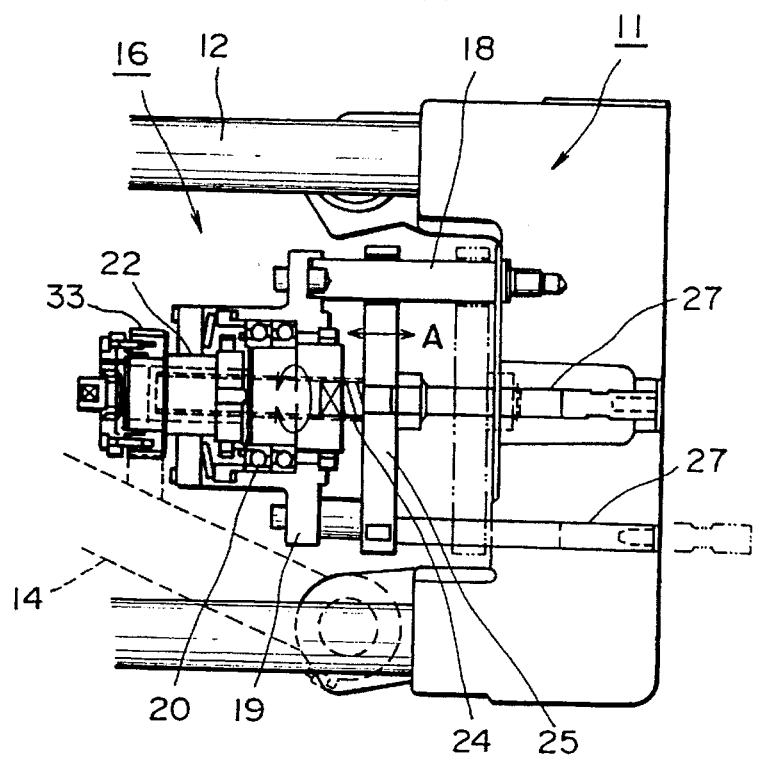
FIG. 1 is a front view of a conventional single-axis ejector apparatus.
Figure 2:
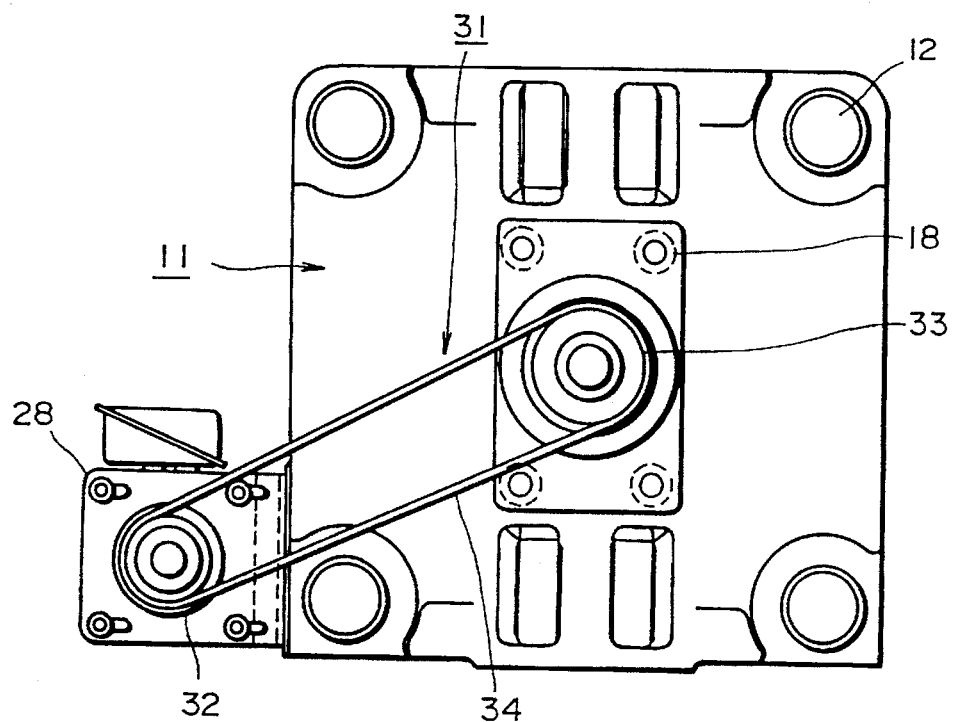
FIG. 2 is a side view of the conventional single-axis ejector apparatus.
Figure 3:
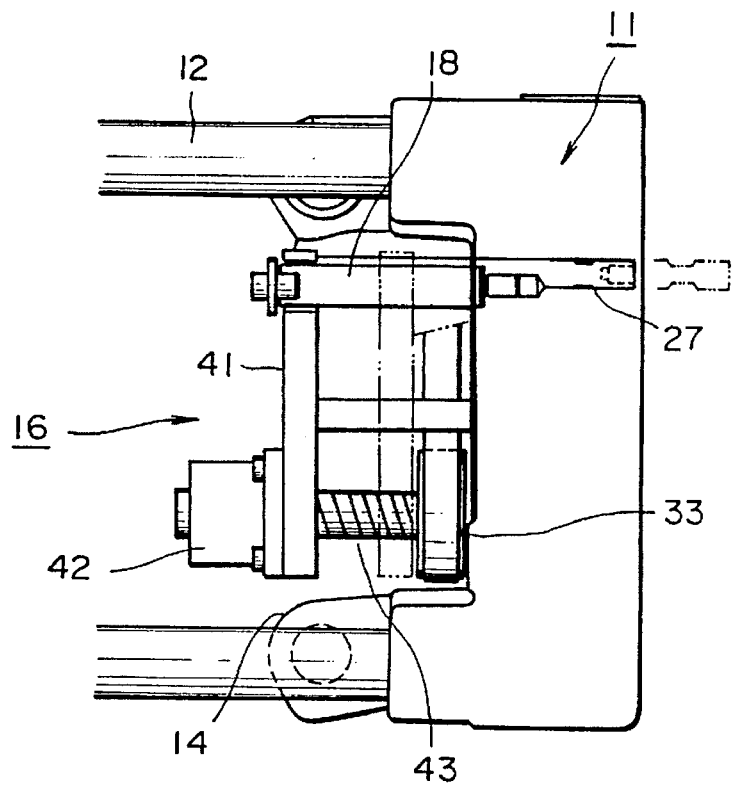
FIG. 3 is a front view of a conventional two-axis ejector apparatus.
Figure 4:
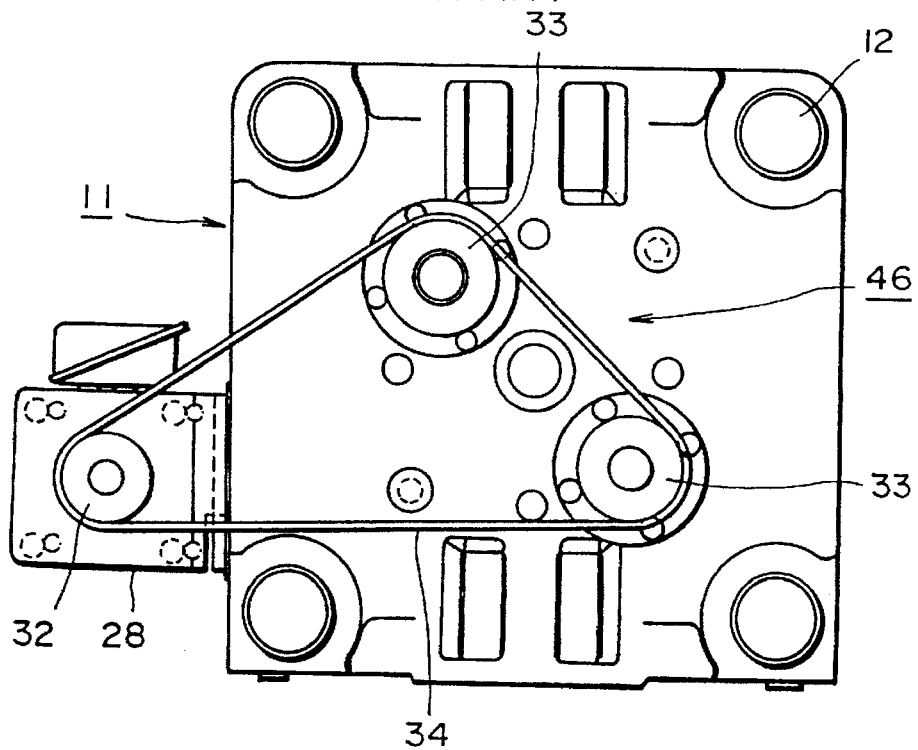
FIG. 4 is a side view of the conventional two-axis ejector apparatus.
Figure 5:
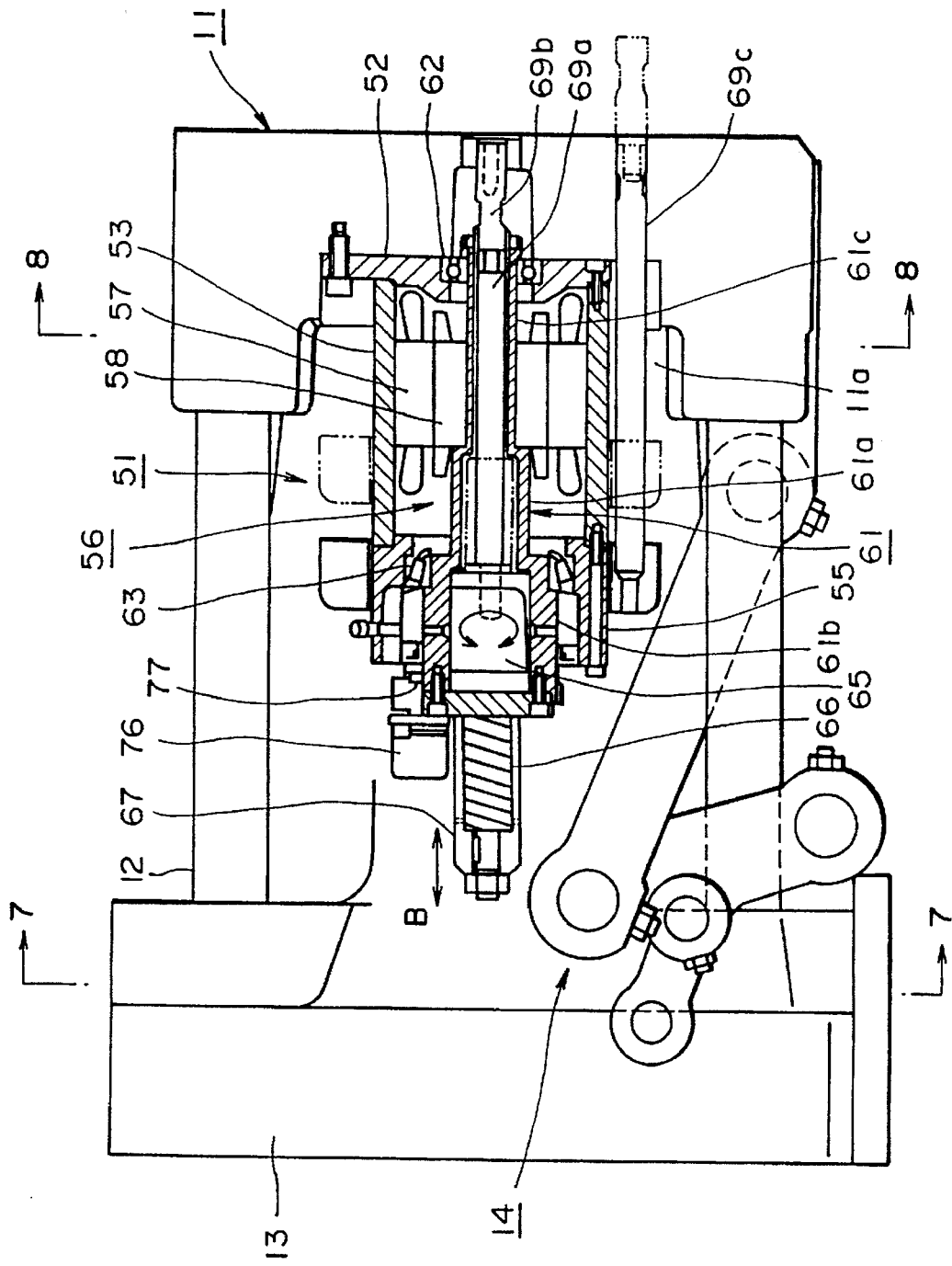
FIG. 5 is a front view of an ejector apparatus according to a first embodiment of the present invention.
Figure 6:
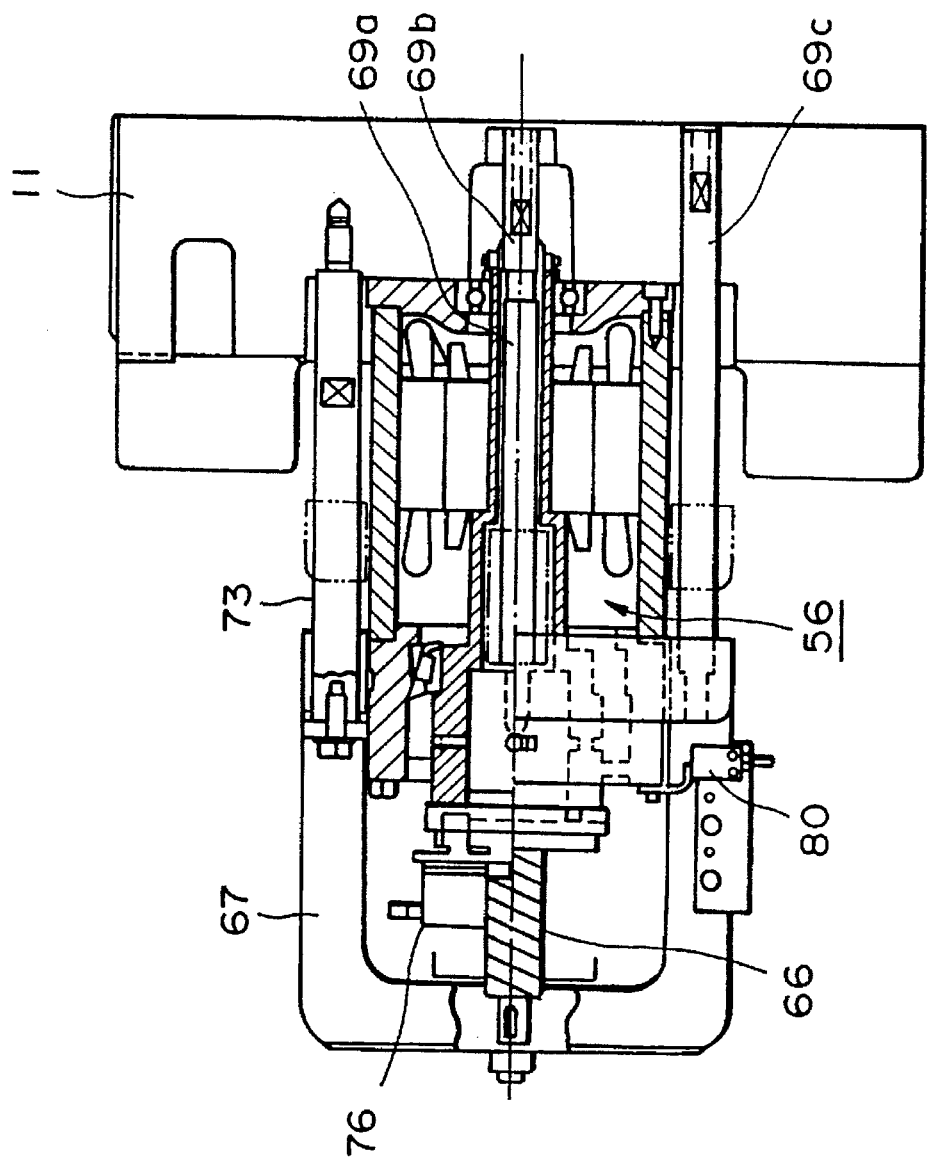
FIG. 6 is a plan view of the ejector apparatus according to the first embodiment of the present invention.
Figure 7:
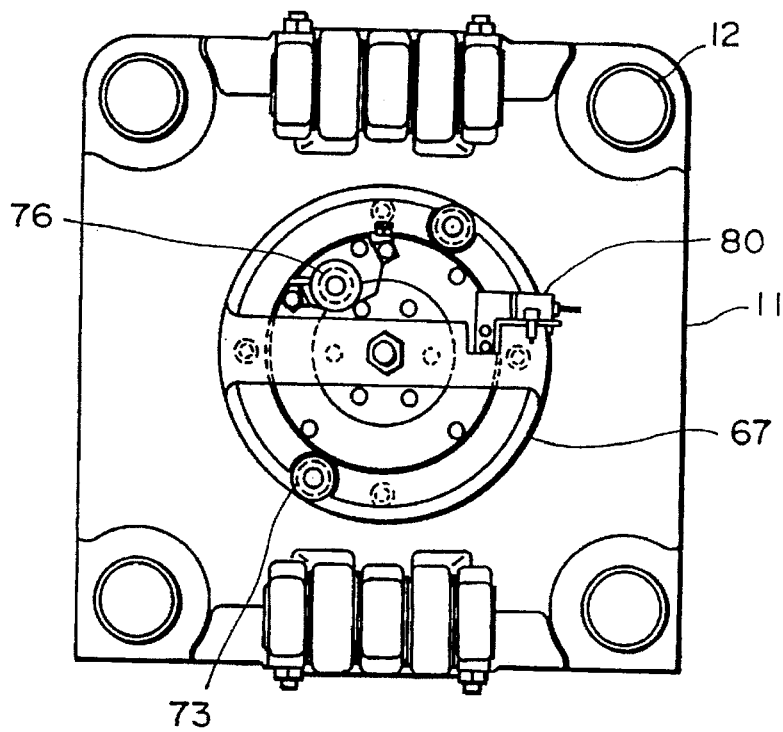
FIG. 7 is a sectional view taken along line X—X in FIG. 5.
Figure 8:
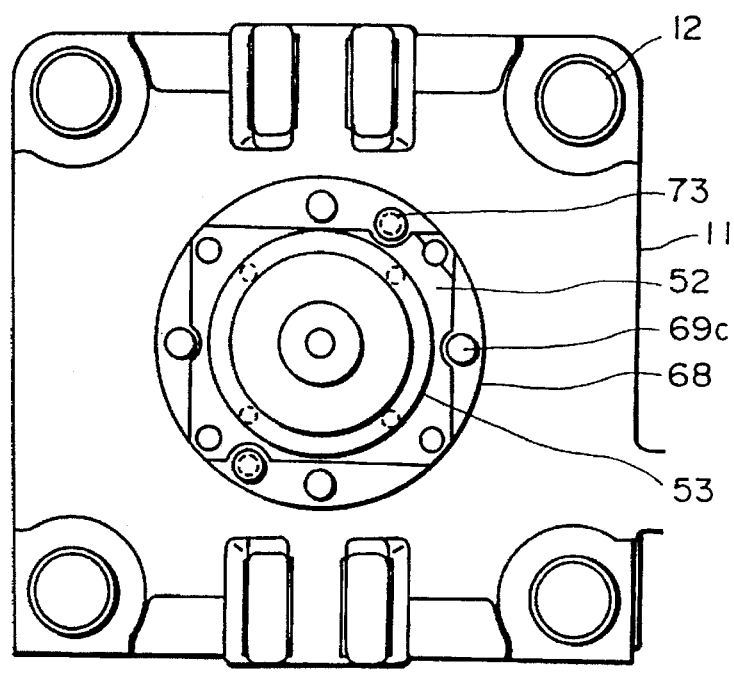
FIG. 8 is a sectional view taken along line Y—Y in FIG. 5.

FIG. 5 is a front view of an ejector apparatus according to a first embodiment of the present invention, FIG. 6 is a plan view of the ejector apparatus according to the first embodiment of the present invention, FIG. 7 is a sectional view taken along line X—X in FIG. 5, and FIG. 8 is a sectional view taken along line Y—Y in FIG. 5.

In these drawings, reference numeral 11 denotes a movable platen. An unillustrated movable die is attached to the front end (to the right end in FIG. 5) of the movable platen 11. The movable platen 11 is advanced and retracted by a toggle mechanism 14 along tie bars 12 extending between an unillustrated stationary platen and a toggle support 13.

An ejector pin feed apparatus 51 is disposed at the rear end (at the left end in FIG. 5) of the movable platen 11. The ejector pin feed apparatus 51 includes a base plate 52 fixed to the movable platen 11, and a cylindrical motor frame 53 is fixed to the rear end of the base plate 52. Further, a support member 55 is fixed to the rear end of the motor frame 53.

A direct drive type servomotor 56 is disposed inside the motor frame 53. The servomotor 56 includes a stator 57 and a rotor 58, and the stator 57 is fixed to the motor frame 53. Also, a hollow shaft 61 is inserted into the rotor 58 and fixed thereto. The front part (the right part in FIG. 5) of the hollow shaft 61 is rotatably supported by the base plate 52 via a bearing 62 while the rear part (the left part in FIG. 5) of the hollow shaft 61 is rotatably supported by the support member 55 via a bearing 63.

The hollow shaft 61 has an intermediate diameter portion 61a, a larger diameter portion 61b, and a smaller diameter portion 61c. The intermediate diameter portion 61a serves as a first portion which allows advancing and retracting movement of the ball screw shaft 66. The larger diameter portion 61b has a diameter larger than that of the intermediate diameter portion 61a and serves as a second portion into which a ball nut 65 is fixedly fitted. The smaller diameter portion 61c has a diameter smaller than that of the intermediate diameter portion 61a and serves as a third portion which allows advancing and retracting movement of an extension rod 69b.

The smaller diameter portion 61c is disposed inside the rotor 58 and between the intermediate diameter portion 61a and the movable platen 11, and the larger diameter portion 61b is disposed between the intermediate diameter portion 61a and the toggle support 13.

The inner circumference of the ball nut 65 is screw-engaged with the ball screw shaft 66. The ball screw shaft 66 penetrates the hollow shaft 61, and a center ejector rod 69a is fixed to the front end of the ball screw shaft 66. The extension rod 69b is fixed to the front end of the center ejector rod 69a.

A cross head 67 is fixed to the rear end of the ball screw shaft 66. The cross head 67 extends forward surrounding the ball nut 65 and the ball screw shaft 66. Therefore, the cross head 67 is advanced and retracted along the outer circumference of the servomotor 56 by advancing and retracting movement of the ball screw shaft 66. The front end of the cross head 67 has an annular shape, and outside ejector rods 69c are fixed to the front end of the cross head 67.

Accordingly, when a current is supplied to the stator 57 of the servomotor 56, the rotor 58 is rotated, so that the hollow shaft 61 and the ball nut 65 fixed to the rotor 58 are rotated. The rotational motion is converted into a linear motion by the ball nut 65 and the ball screw shaft 66, whereby the ball screw shaft 66 is advanced and retracted in the direction of arrow B. Since rotation of the cross head 67 is restricted by guide bars 73, the cross head 67 is translated along the guide bars 73.

Since the cross head 67 the center ejector rod 69a, and the outside ejector rods 69c can be advanced and retracted by the advancing and retracting movement of the ball screw shaft 66, it is possible to advance the center ejector rod 69a and the outside ejector rods 69c so as to advance unillustrated ejector pins, thereby pushing out a molded product.

In the present embodiment, a depression 11a is formed in the rear end surface of the movable platen 11, and the ejector pin feed apparatus 51 is fixed to the bottom of the depression 11a. Further, the cross head 67 includes a rear portion having a U-like shape and a front end portion having an annular shape, which are integrally formed together. Therefore, the ejector apparatus is prevented from interfering with the toggle mechanism 14.

Numeral 76 denotes an encoder which is disposed such that the encoder 76 faces a gear 77 formed at the rear end of the hollow shaft 61. The encoder 76 detects the amount of rotation of the hollow shaft 61. Numeral 80 denotes a proximity switch for detecting the retraction limit position of the ejector pins. A limit switch may be used instead of the proximity switch 80.

In the present embodiment, any types of motors such as an induction motor and a synchronous motor can be used as the servomotor 56.

Next, a second embodiment of the present invention will be described.

Figure 9:
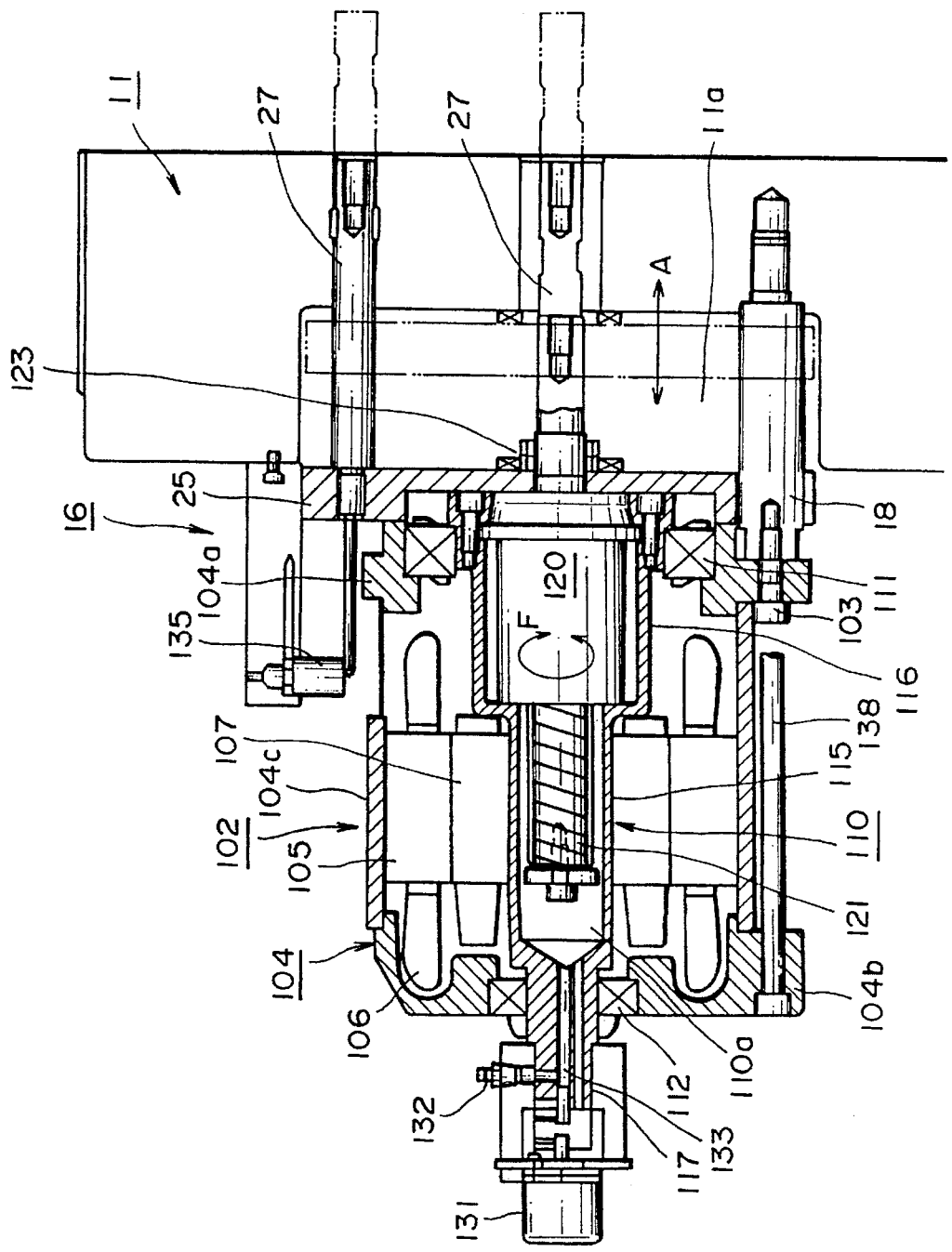
FIG. 9 is a sectional view of a main portion of an ejector apparatus according to a second embodiment of the present invention.
Figure 10:
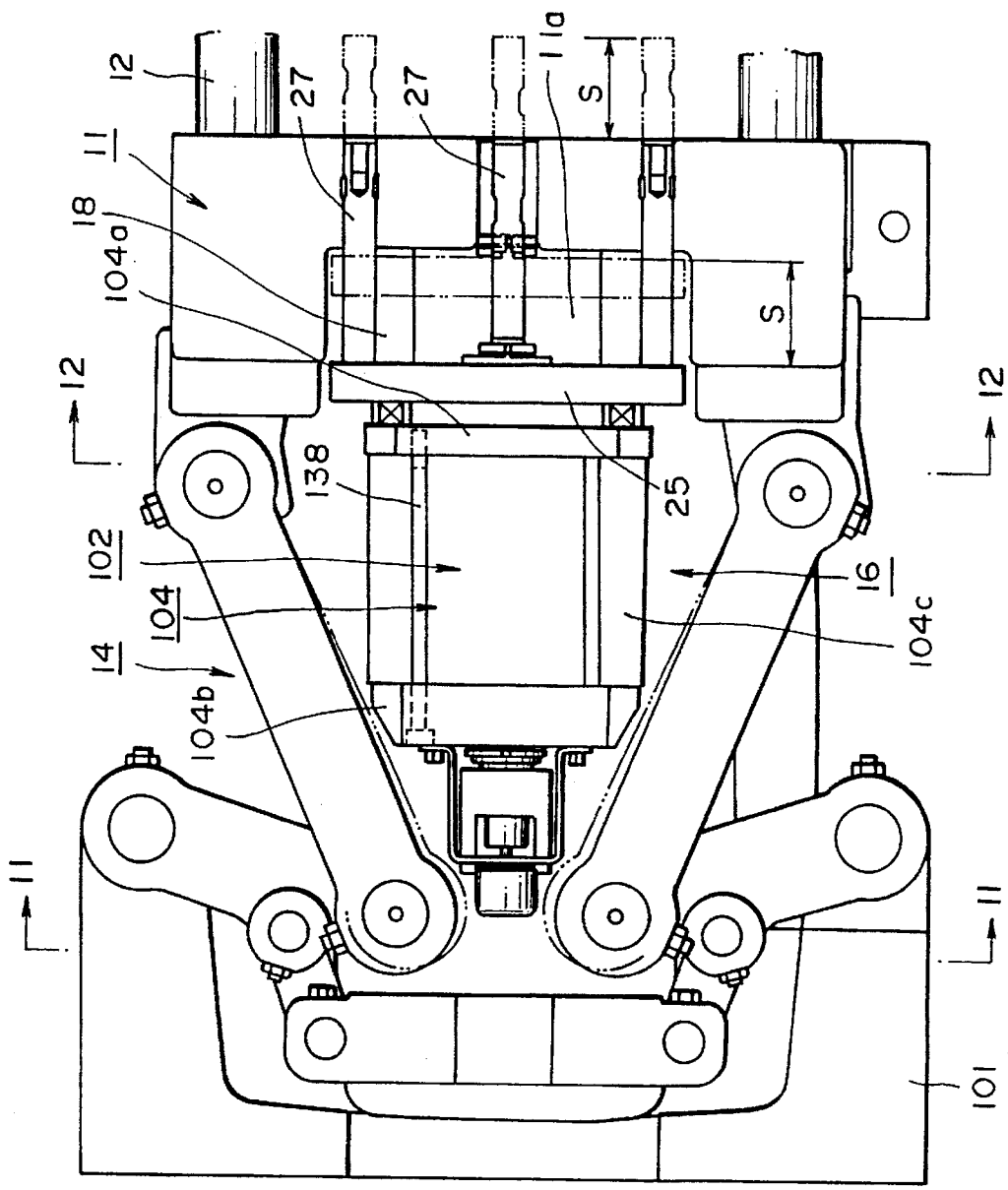
FIG. 10 is a schematic illustration of the ejector apparatus according to the second embodiment of the present invention.
Figure 11:
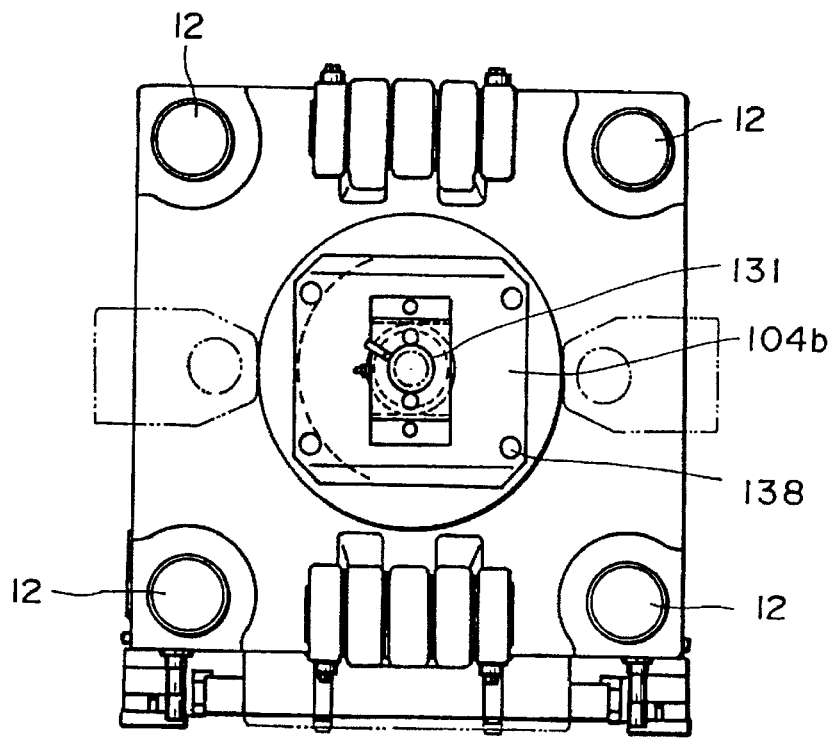
FIG. 11 is a sectional view taken along line V—V in FIG. 10.
Figure 12:
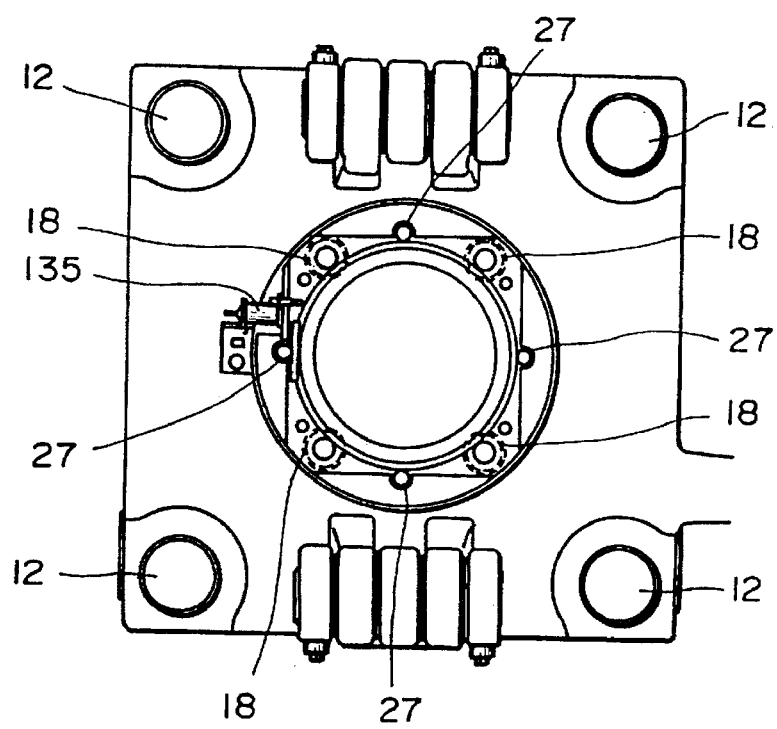
FIG. 12 is a sectional view taken along line W—W in FIG. 10.

FIG. 9 is a sectional view of a main portion of an ejector apparatus according to the second embodiment of the present invention, FIG. 10 is a schematic illustration of the ejector apparatus according to the second embodiment of the present invention, FIG. 11 is a sectional view taken along line V—V in FIG. 10, and FIG. 12 is a sectional view taken along line W—W in FIG. 10.

In these drawings, reference numeral 11 denotes a movable platen. An unillustrated movable die is attached to the front end (to the right end in FIGS. 9 and 10) of the movable platen 11. The movable platen 11 is advanced and retracted by a toggle mechanism 14 along tie bars 12 extending between an unillustrated stationary platen and a toggle support 101.

An ejector pin feed apparatus 16 is disposed at the rear end (at the left end in FIGS. 9 and 10) of the movable platen 11. The ejector pin feed apparatus 16 includes guide posts 18. The front ends of the guide posts 18 are fixed to a surface of the movable platen 11 which faces the toggle support 101. A servomotor 102 is fixed to the rear ends of the guide posts 18 using bolts 103.

The servomotor 102 includes a stator 105 fixed to a motor frame 104, a coil 106 fixed to the stator 105, and a rotor 107 disposed inside the stator 105 with a small clearance therebetween. The rotor 107 can be rotated by supplying a current to the coil 106. The motor frame 104 is composed of a front plate 104a, a rear plate 104b, a side plate 104c, and clamp rods 138 for connecting the front plate 104a and the rear plate 104b for assembling the motor frame 104. Any types of motors such as an induction motor and a synchronous motor can be used as the servomotor 102.

Further, a hollow shaft 110 is inserted into the rotor 107 and fixed thereto, and the both ends of the hollow shaft 110 are supported by bearings 111 and 112 to be rotatable with respect to the motor frame 104.

The hollow shaft 110 has an intermediate diameter portion 115, a larger diameter portion 116, and a smaller diameter portion 117. The intermediate diameter portion 115 serves as a first portion which allows advancing and retracting movement of the ball screw shaft 121. The larger diameter portion 116 has a diameter larger than that of the intermediate diameter portion 115 and serves as a second portion into which a ball nut 120 is fixedly fitted. The smaller diameter portion 117 has a diameter smaller than that of the intermediate diameter portion 115 and serves as a third portion.

The intermediate diameter portion 115 is disposed inside the rotor 107. The smaller diameter portion 117 is disposed between the intermediate diameter portion 115 and the toggle support 101, and the larger diameter portion 116 is disposed between the intermediate diameter portion 115 and the movable platen 11.

A ball screw shaft 121 is disposed such that it is screw-engaged with the ball nut 120. A cross head 25 is fixed to the front end of the ball screw shaft 121 using a ball nut 123, and ejector rods 27 are fixed to the cross head 25. Rotation of the cross head 25 is prevented by the guide posts 18.

Accordingly, when the rotor 107 is rotated by driving the servomotor 102, the ball nut 120 is rotated in the direction of arrow F. The rotational motion of the ball nut 120 is converted into a linear motion by the ball nut 120 and the ball screw shaft 121, so that the cross head 25 is advanced and retracted along the guide posts 18 in the direction of arrow A. As a result, the ejector rods 27 and unillustrated ejector pins are advanced and retracted in the same direction.

At this time, the cross head 25 and the ejector rods 27 must be advanced and retracted over a stroke S which is required to push out an unillustrated molded product by the ejector pins. For this purpose, a depression 11a is formed in the movable platen 11 to a depth corresponding to the stroke S. Also, since the ball screw shaft 121 is advanced and retracted over the stroke S by rotating the ball nut 120, a hollow portion 110a is formed in the intermediate diameter portion 115 such that the hollow portion 110a extends over a length corresponding to the stroke S.

In the ejector apparatus of the present embodiment, rotational motion produced by the servomotor 102 is converted into a linear motion so as to directly operate the ejector pin feed apparatus 16. Therefore it becomes unnecessary to use a timing belt.

Accordingly, the durability of the ejector apparatus can be improved, and the peripheral area of the injection molding machine can be prevented from being dirtied.

The ball screw shaft 121 is disposed to be advanced and retracted within the hollow shaft 110. This allows the servomotor 102 and the ball screw shaft 121 to be integrated together to shorten the axial length of the servomotor 102. Further, the cross head 25 is disposed to be advanced and retracted within the depression 11a of the movable platen 11. Accordingly, the dimension of the ejector pin feed apparatus 16 in the axial direction can be decreased. Also, since the rotor 107 is disposed outside the intermediate diameter portion 115 of the hollow shaft 110 and the ball nut 120 is disposed inside the larger diameter portion 116 of the hollow shaft 110, the rotor 107 and the ball nut 120 can be overlapped with each other in the radial direction. Accordingly, the dimension of the ejector pin feed apparatus 16 in the radial direction can be decreased.

As a result, the ejector pin feed apparatus 16 can be disposed inside the toggle mechanism 14, thereby decreasing the size of the die clamping apparatus.

An encoder 131 is attached to the rear end of the hollow shaft 110 so as to control the servomotor 102. The encoder 131 serves as a rotational amount sensor for detecting the amount of rotation of the hollow shaft 110. Therefore, the rotational amount of the rotor 107 can be directly detected by the encoder 131. Accordingly, the position of the cross head 25 can be detected accurately. Also, a proximity switch 135 is disposed on the movable platen 11 so as to detect the retraction limit position of the cross head 25. The proximity switch 135 is reset after each molding cycle. A limit switch may be used instead of the proximity switch 135.

Since the hollow shaft 110 and the ball nut 120 are rotated by driving the servomotor 102, delay would be produced in the control of rotational amount if the inertia of the hollow shaft 110 and the ball nut 120 is large. Therefore, the walls of the hollow shaft 110 and the ball nut 120 are thinned to reduce the inertia.

Moreover, the area between the ball nut 120 and the ball screw shaft 121 is lubricated with lubricant such as grease so as to reduce the friction produced between the ball nut 120 and the ball screw shaft 121. A grease supply hole 132 is formed in the smaller diameter portion 117, and a connection passage 133 is formed in the smaller diameter portion 117 so as to connect the grease supply hole 132 and the hollow portion 110a. With this structure, grease is supplied to the hollow portion 110a.

The present invention is not limited to the above-described embodiments. Numerous modifications and variations of the present invention are possible in light of the spirit of the present invention, and they are not excluded from the scope of the present invention.

What is claimed is:

1. An ejector apparatus comprising:
   (a) a movable platen disposed facing a stationary platen and adapted for advancing and retracting movement along tie bars;
   (b) a toggle mechanism disposed between said movable platen and a toggle support so as to advance and retract said movable platen;
   (c) a servomotor fixed to said movable platen and including a stator and a rotor;
   (d) a hollow shaft fixed to said rotor;
   (e) a ball nut fixed to said hollow shaft;
   (f) a ball screw shaft which is screw-engaged with said ball nut and is advanced and retracted by rotation of said ball nut;
   (g) a cross head connected to said ball screw shaft so as to be advanced and retracted together with said ball screw shaft; and
   (h) an ejector pin connected to said cross head.

2. An ejector apparatus according to claim 1, wherein a depression is formed in a rear end surface of said movable platen.

3. An ejector apparatus according to claim 1, wherein said cross head is connected to the rear end of said ball screw shaft and is disposed to surround said ball nut.

4. An ejector apparatus according to claim 1, wherein said cross head is connected to the front end of said ball screw shaft.

5. An ejector apparatus according to claim 1, wherein said hollow shaft comprises a first portion for allowing advancing and retracting movement of said ball screw shaft, and a second portion having a diameter greater than that of said first portion and housing said ball nut.

6. An ejector apparatus according to claim 5, wherein said first portion is disposed within said rotor.

7. An ejector apparatus according to claim 5, wherein said hollow shaft further comprises a third portion having a diameter smaller than that of said first portion.

8. An ejector apparatus according to claim 7, wherein a rotational amount sensor is disposed at said third portion.

9. An ejector apparatus according to claim 7, wherein a hole for supplying lubricant is provided at said third portion.

* * * * *